United States Patent
Miyazaki et al.

(10) Patent No.: US 7,272,561 B2
(45) Date of Patent: Sep. 18, 2007

(54) SPEECH RECOGNITION DEVICE AND SPEECH RECOGNITION METHOD

(75) Inventors: Toshiyuki Miyazaki, Fujisawa (JP); Yoji Ishikawa, Machida (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 867 days.

(21) Appl. No.: 10/332,875

(22) PCT Filed: Jul. 13, 2001

(86) PCT No.: PCT/JP01/06092

§ 371 (c)(1),
(2), (4) Date: Jan. 13, 2003

(87) PCT Pub. No.: WO02/07146

PCT Pub. Date: Jan. 24, 2002

(65) Prior Publication Data

US 2005/0119883 A1 Jun. 2, 2005

(51) Int. Cl.
*G10L 15/00* (2006.01)
(52) U.S. Cl. .................... 704/256; 704/257
(58) Field of Classification Search ............ 704/256, 704/257, 243
See application file for complete search history.

(56) References Cited

U.S. PATENT DOCUMENTS

| | | | |
|---|---|---|---|
| 5,349,645 A * | 9/1994 | Zhao | 704/243 |
| 5,598,507 A | 1/1997 | Kimber et al. | |
| 5,621,859 A | 4/1997 | Schwartz et al. | |
| 5,865,626 A | 2/1999 | Beattie et al. | |
| 5,983,180 A * | 11/1999 | Robinson | 704/254 |
| 6,064,963 A * | 5/2000 | Gainsboro | 704/270 |

FOREIGN PATENT DOCUMENTS

| | | |
|---|---|---|
| JP | 5-197388 | 8/1993 |
| JP | 2983364 B2 | 9/1999 |

OTHER PUBLICATIONS

Puel et al., "Cellular Phone Speech Recnogition: Noise Compensation vs. Robust Architectures", 5th European Conference on Speech Communication and Technology, EuroSpeech 1997, Rhodes, Greece and European Conference On Speech Communication and Technology (Eurospeech), Grenoble, Esca, France, pp. 1151-1154 (Sep. 1997).

(Continued)

*Primary Examiner*—Daniel Abebe
(74) *Attorney, Agent, or Firm*—Dickstein, Shapiro, LLP.

(57) ABSTRACT

Each word to be recognized is represented by gender-specific hidden Markov models that are stored in a ROM 6 along with output probability functions and preset transition probabilities. A speech recognizer 4 determines an occurrence probability of a feature parameter sequence detected by a feature value detector 3 using the hidden Markov models. The speech recognizer 4 determines the occurrence probability by giving each word a state sequence of one hidden Markov model common to the gender-specific hidden Markov models, multiplying each preset pair of an output probability function value and a transition probability together among the output probability functions and transition probabilities stored in the ROM 6, selecting the largest product as the probability of each state of the common hidden Markov model, determining the occurrence probability based on the selected product, and recognizing the input speech based on the occurrence probability thus determined.

10 Claims, 8 Drawing Sheets

OTHER PUBLICATIONS

Ming et al., "Improving Speech Recognition Performance by Using Multi-Model Approaches", 1999 IEEE International Conference on Acoustics, Speech, and Signal Processing, Phoenix, Arizona, U.S.A. and IEEE International Conference on Acoustics Speech, and Signal Processing (ICASSP), New York, NY., U.S.A., pp. 161-164 (Mar. 1999).

Hattori et al., "Speaker Weighted Training of HMM Using Multiple Reference Speakers", IEICE Transactions on Information and Systems, Institute of Electronics Information and Comm. Eng., Tokyo, Japan, pp. 219-225 (Feb. 1993).

Kiyohira Shikano et al., entitled "Digital Signal Processing for Speech and Sound Information", published on Nov. 10, 1997, Shokoda, Ltd.

* cited by examiner

COMMON PHONEME SEQUENCE FOR BOTH MALES AND FEMALES

*FIG. 2 (B)*

HMM STATE SEQUENCE OF EACH PHONEME

PHONEME SEQUENCE

*FIG. 4 (B)*

HMM STATE SEQUENCE OF LAST PHONEME SYSTEM

*FIG. 5*

| RECOGNITION METHOD | AVERAGE RECOGNITION RATE | NO. OF PERSONS WITH RECOGNITION RATE OF LESS THAN 60% | WORKING MEMORY (RAM) | VOCABULARY STORAGE MEMORY (ROM) |
|---|---|---|---|---|
| COMMON ACOUSTIC MODEL FOR BOTH MALES AND FEMALES | 60.1(%) | 8 | 19.5KBYTES | 6.4KBYTES |
| SEPARATE MULTI-TEMPLATE MODELS FOR MALES AND FEMALES | 71.8(%) | 4 | 29.5KBYTES | 12.8KBYTES |
| EMBODIMENT OF THIS INVENTION | 74.0(%) | 3 | 19.5KBYTES | 6.4KBYTES |

FIG. 6

| VOWEL | a, i, u, e, o |
|---|---|
| FRICATIVE | f, z, s, zh, sh, h |
| AFFRICATE | dz, ts, dh, ch |
| PLOSIVE | b, p, d, t, g, k |
| SEMIVOWEL | w, r, y |
| NASAL | m, n, ng |

FIG. 7 (A)

COMMON PHONEME SEQUENCE FOR BOTH MALES AND FEMALES

FIG. 7 (B)

HMM STATE SEQUENCE OF EACH PHONEME SEQUENCE

HMM STATE SEQUENCE OF EACH PHONEME SEQUENCE

PHONEME SEQUENCE

FIG. 11 (B)

HMM STATE SEQUENCE OF LAST PHONEME

SPEECH RECOGNITION DEVICE AND SPEECH RECOGNITION METHOD

FIELD OF THE INVENTION

The present invention relates to a speech recognition device and speech recognition method using hidden Markov models (HMMs). More particularly, the present invention makes it possible to recognize sounds of words contained in a vocabulary list with high accuracy and reduce memory requirements even if speech characteristics vary with the age and sex of the speaker or if there is more than one way to vocalize a single vocabulary item, for example, when expressed colloquially.

BACKGROUND OF THE INVENTION

Generally, technology for recognizing fixed words common to unspecified users is known as speaker independent speech recognition. In speaker independent speech recognition, information about feature parameters of fixed words common to unspecified users is accumulated in a storage unit such as a ROM.

Known methods for converting speech samples into a feature parameter sequence include cepstrum analysis and linear predictive analysis. Methods employing hidden Markov models are generally used to prepare information (data) about feature parameters of fixed words common to unspecified users and compare the information with the feature parameter sequence converted from input speech.

Speaker independent speech recognition by means of hidden Markov models is described in detail in "Digital Signal Processing for Speech and Sound Information" (by Kiyohiro Shikano, Tetsu Nakamura, and Shiro Ise (Shokodo, Ltd.)).

Figure 6:
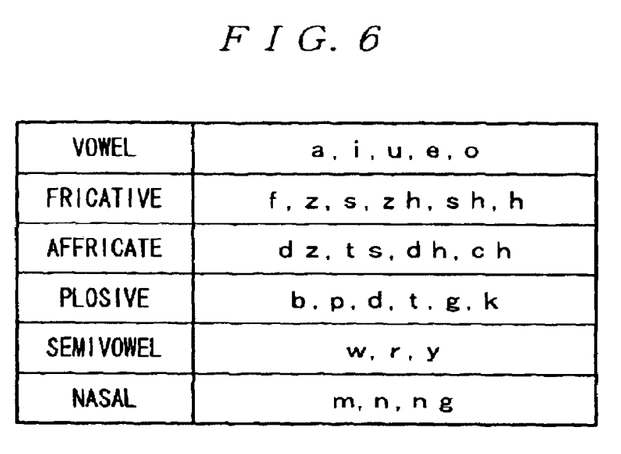
FIG. 6 is a diagram showing a list of phoneme set labels.

For example, in the case of the Japanese language, a phoneme set described in Chapter 2 of "Digital Signal Processing for Speech and Sound Information" is used as a speech unit and each phoneme is modeled using a hidden Markov model. FIG. 6 shows a list of phoneme set labels. The word "Hokkaido," for example, may be modeled using a network (sequence of fixed-word labels) of phoneme labels common to speakers.

Figure 7:
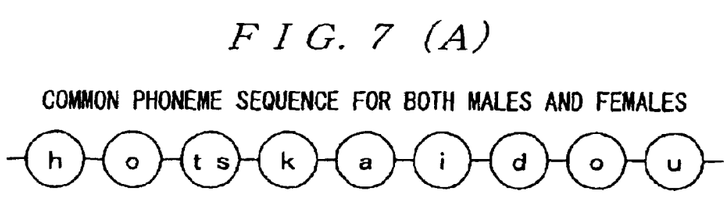
FIG. 7 is a diagram showing a Viterbi algorithm using conventional common hidden Markov model for both males and females.

If the sequence of fixed-word labels shown in FIG. 7(A) and phoneme model data based on corresponding hidden Markov models as shown in FIG. 7(B) are provided, those skilled in the art can easily construct a speaker independent speech recognition device using the Viterbi algorithm described in Chapter 4 of "Digital Signal Processing for Speech and Sound Information."

In FIG. 7(B), a(I, J) represents the transition probability of transition from state I to state J. For example, a(1, 1) in the figure represents the transition probability of transition from state 1 to state 1. Also, b(I, x) represents an output probability of state I given acoustic parameter (feature parameter) x. Thus, b(1, x) in the figure represents the output probability of state 1 when acoustic parameter x is detected.

In FIG. 7(B), pI represents the probability of state I and is updated according to Equation (1) below.

$$pI = \max(p(I-1) \times a(I-1, I), pI \times a(I, I)) \times b(I, X) \qquad (1)$$

Incidentally, max( ) on the right side of Equation (1) means that the largest product is selected from among the products in max( ). The same applies hereinafter.

Figure 8:
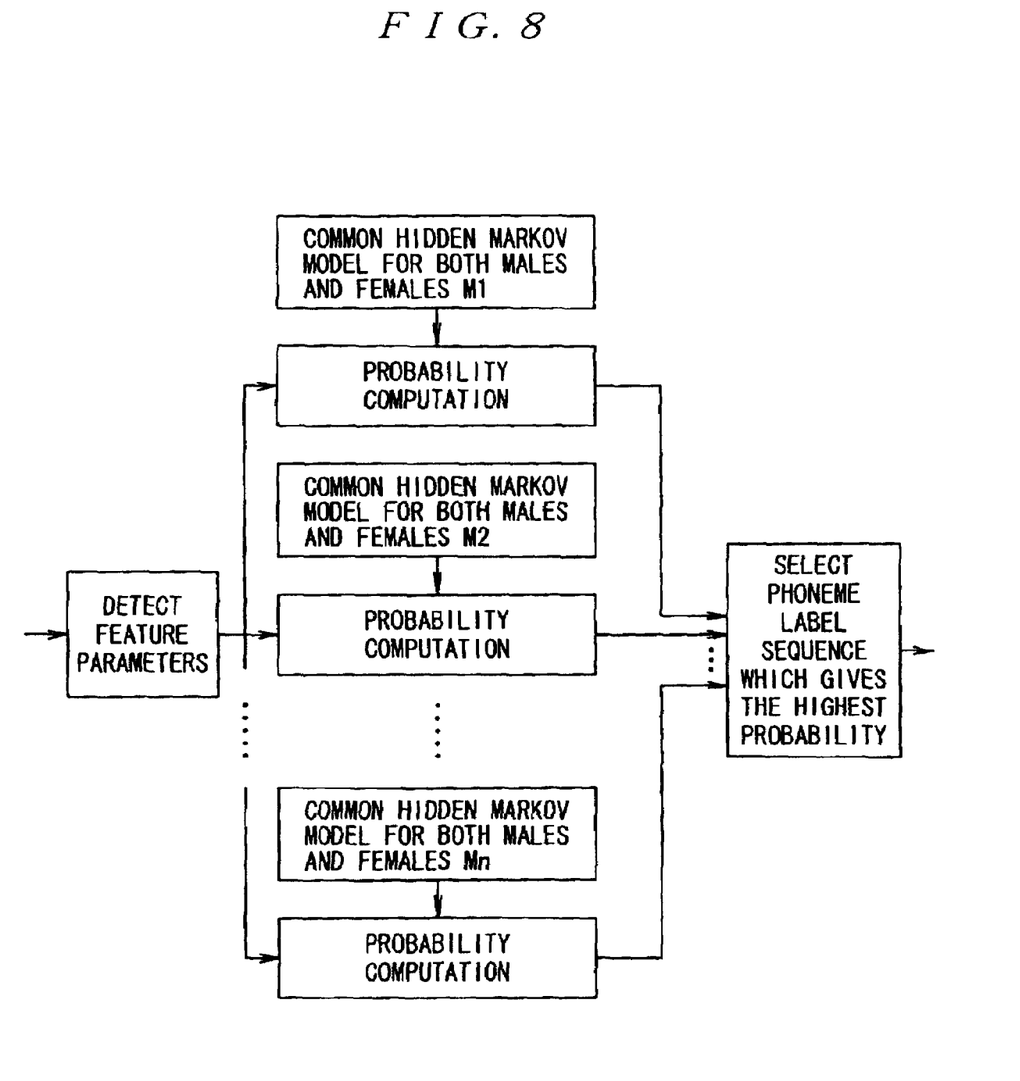
FIG. 8 is a diagram showing an overall flow of recognition operations using the conventional common hidden Markov model for both males and females.

Next, an overall flow of speech recognition using the above-mentioned hidden Markov models common to both males and females will be described with reference to FIG. 8.

First, feature parameters are detected in (extracted from) a speech signal. Occurrence probabilities of the feature parameter sequence are calculated using Equation (1) for each of the common hidden Markov models for both males and females. The common hidden Markov models, M1, M2, . . . Mn are determined in advance of the speech recognition process. The highest probability is selected from the calculated occurrence probabilities. The input speech is recognized by selecting the phoneme label sequence having the highest occurrence probability.

Figure 9:
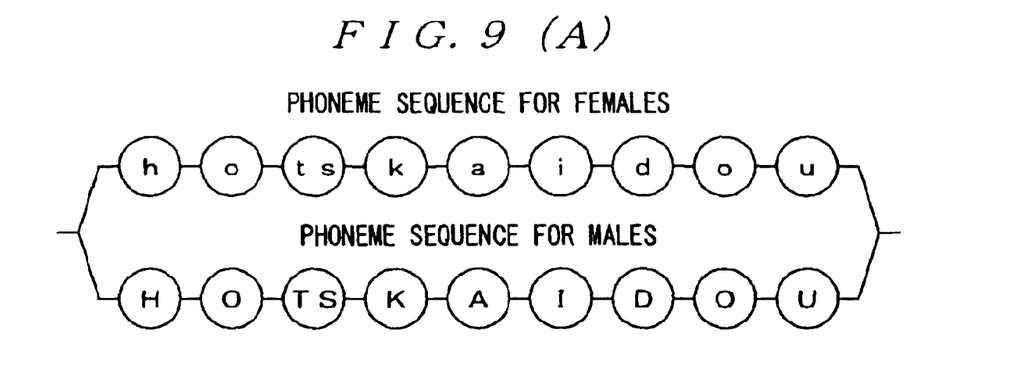
FIG. 9 is a diagram showing a Viterbi algorithm using conventional multi-template, gender-specific hidden Markov models.

Acoustic conditions generally differ between adult males and females due to difference in vocal-tract length. Thus, in a method (multi-template) sometimes used to improve speech recognition rates, an acoustic model for males and an acoustic model for females are prepared separately, as shown in FIG. 9(A), using male voice data and female voice data and then hidden Markov model state sequences which compose a vocabulary to be recognized when spoken are prepared for males and females as shown in FIG. 9(B).

In FIG. 9(B), a(I, J) represents the transition probability of a model for females transitioning from state I to state J while A(I, J) represents the transition probability of a model for males transitioning from state I to state J. Also, b(I, x) represents an output probability in state I when acoustic parameter x of the model for females is obtained while B(I, x) represents an output probability in state I when acoustic parameter x of the model for males is obtained.

In FIG. 9(B), pI represents the probability of state I of the model for females and is updated according to Equation (2) below.

$$pI = \max(p(I-1) \times a(I-1, I), pI \times a(I, I)) \times b(I, X) \qquad (2)$$

Also in FIG. 9(B), PI represents the probability of state I of the model for males and is updated according to Equation (3) below.

$$PI = \max(P(I-1) \times A(I-1, I), PI \times A(I, I)) \times B(I, X) \qquad (3)$$

Figure 10:
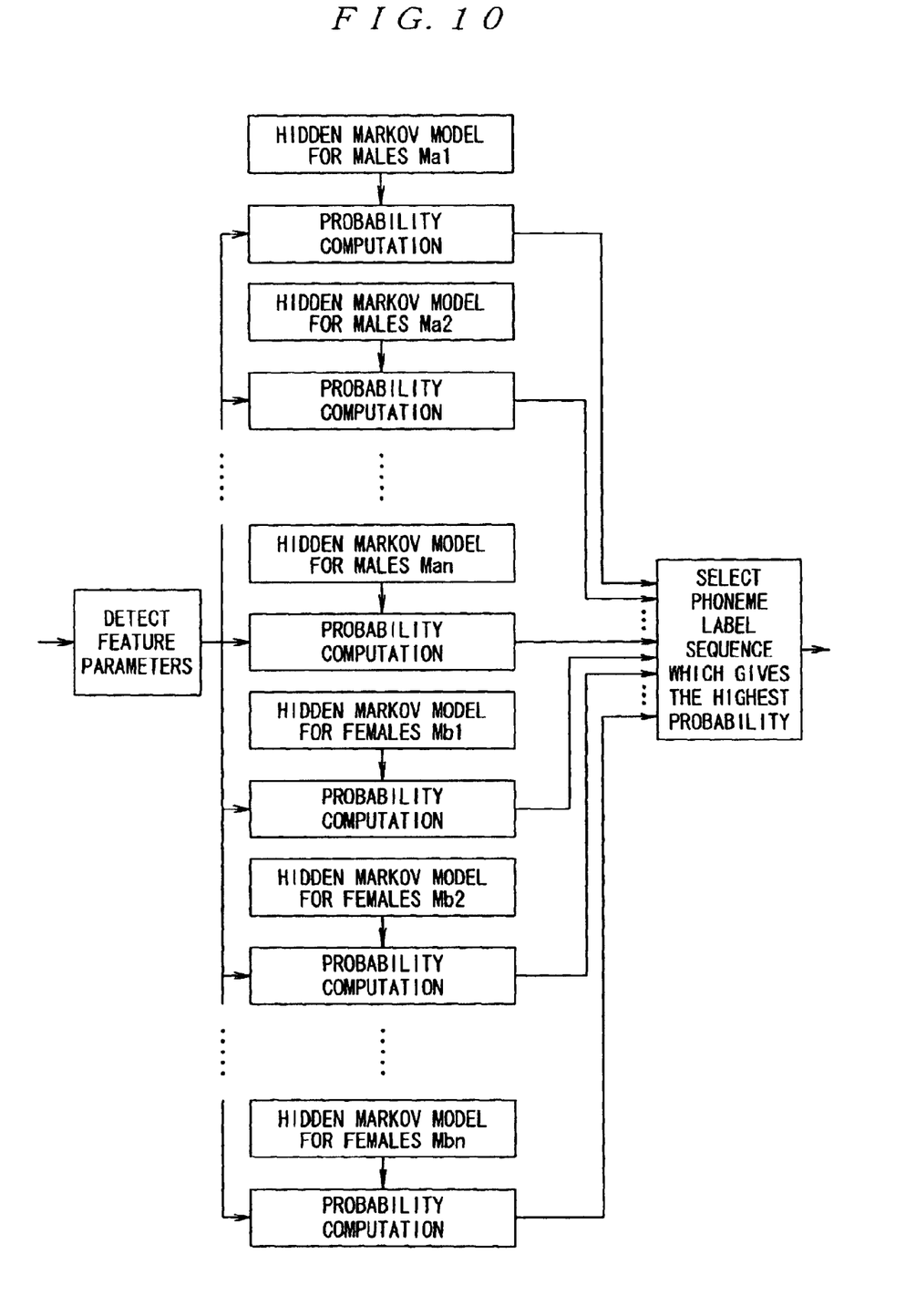
FIG. 10 is a diagram showing an overall flow of recognition operations using the conventional multi-template, gender-specific hidden Markov models.

Next, an overall flow of speech recognition using the above-mentioned two types of hidden Markov models, hidden Markov models for males and females, will be described with reference to FIG. 10.

First, feature parameters are detected in (extracted from) a speech signal. Next, with reference to the detected feature parameters, hidden Markov models (words) Ma1, Ma2, . . . Man for males determined in advance, and hidden Markov models (words) Mb1, Mb2, . . . Mbn for females determined in advance, occurrence probabilities of the feature parameter sequence are calculated using Equations (2) and (3). Then, the highest probability is selected from the calculated probabilities and the phoneme label sequence which gives the highest probability is obtained as a recognition result of the input speech.

In this case, the speech recognition rate is improved compared to a single acoustic model (hidden Markov model) prepared from male voice data and female voice data. The memory, however, used to compose a vocabulary doubles when compared to the common model for both males and females. In addition, the memory used to hold information about probabilities of various states also increases when gender specific Markov models are used.

As described above, the use of multi-template, gender-specific acoustic models for speaker independent speech recognition improves the speech recognition rate compared to when one acoustic model is prepared from male voice data and female voice data, but introduction of the multi-template practically doubles the vocabulary, resulting in increased memory usage.

Recently, there has been growing demand for speech recognition on application programs from an increasingly wider range of age groups, and a high speech recognition rate is desired irrespective of age groups. Thus, it is conceivable that separate acoustic models for adult males, adult females, children of elementary school age and younger, aged males and aged females may be used in the future. In such a situation, the vocabulary may increase by a factor of five, further increasing memory requirements.

The larger the vocabulary, the more serious the increase in memory requirements will be. The increased memory requirements for the larger vocabulary creates a large cost (production cost) disadvantage, for example, when incorporating speech recognition into a portable telephone. Thus, it is desired to curb increases in memory requirements and reduce production costs while improving speech recognition rates using multiple acoustic models.

Figure 11:
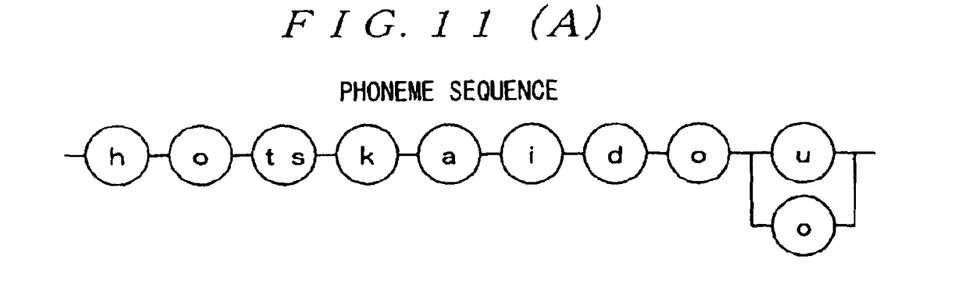
FIG. 11 is a diagram showing conventional example of a Viterbi algorithm using common hidden Markov model for both males and females when a vocabulary item can be pronounced in two ways.

Incidentally, even when a common acoustic model for both males and females is used, some single vocabulary item (word) is treated as two vocabulary items if it has different colloquial expressions. For example, the word "Hokkaido" may be pronounced in two ways. "hotskaidou" and "hotskaidoo." This can be solved using the Viterbi algorithm as shown in FIG. 11.

In FIG. 11(B), au(I, J) represents the transition probability of the phoneme u transitioning from state I to state J while ao(I, J) represents the transition probability of the phoneme o transitioning from state I to state J. Also, bu(I, x) represents an output probability in state I when acoustic parameter x of the phoneme u is obtained while bo(I, x) represents an output probability in state I when acoustic parameter x of the phoneme o is obtained.

In FIG. 11(B), uI represents the probability of state I of the phoneme u and is updated according to Equation (4) below.

$$uI=\max(u(I-1)\times au(I-1, I), uI\times au(I, I))\times bu(I, X) \quad (4)$$

Also in FIG. 11(B), oI represents the probability of state I of the phoneme o and is updated according to Equation (5) below.

$$oI=\max(o(I-1)\times ao(I-1, I), oI\times ao(I, I))\times bo(I, X) \quad (5)$$

Again, memory requirements increase as in the case where multi-template, gender-specific acoustic models are used.

Thus, an object of the present invention is to provide a speech recognition device and speech recognition method that can improve the accuracy of speech recognition rates without substantially increasing the memory requirements of working memory or the like for speech recognition.

SUMMARY

The present invention provides a speech recognition device for recognizing speech of unspecified speakers using hidden Markov models, the above described device comprising: detection means for detecting feature parameters of input speech; recognition data storage means for prestoring output probability functions and transition probabilities which use, as arguments, the above described feature parameters preset in multiple predetermined types of hidden Markov models which represent each of a plurality of predetermined words; recognition means for determining the occurrence probability that a sequence of the above described feature parameters will occur, with reference to the feature parameters detected by the above described detection means and to the above described hidden Markov models; characterized in that the above described recognition means gives each of the above described words a state sequence of one hidden Markov model common to the above described multiple types of hidden Markov models in the process of determining the above described occurrence probability, and the above described recognition means multiplies each preset pair of an output probability function value and a transition probability together among the output probability functions and transition probabilities stored in the above described recognition data storage means, selects the largest product as the probability of each state of the above described common hidden Markov model, determines the above described occurrence probability based on the selected largest product, and then recognizes the input speech based on the occurrence probability thus determined.

Implementations of the speech recognition device according to the present invention include a speech recognition device characterized in that the above described recognition means shares the transition probability of each state of the above described hidden Markov model among the above described multiple types of hidden Markov models in order to determine the above described occurrence probability.

Implementations of the speech recognition device according to the present invention include a speech recognition device characterized in that the above described multiple predetermined types of hidden Markov models consist of at least two types from among gender-specific hidden Markov models, age-specific multiple hidden Markov models, multiple hidden Markov models based on voice data which contain different types of noise, and other hidden Markov models.

The present invention provides a speech recognition device for recognizing speech of unspecified speakers using hidden Markov models, the above described device comprising: detection means for detecting feature parameters of input speech; recognition data storage means for prestoring output probability functions and transition probabilities which use, as arguments, the above described feature parameters preset in hidden Markov models each of which represents each of a plurality of predetermined words and in a plurality of hidden Markov models which partially express differences in pronunciations of each of words which are allowed multiple pronunciations out of the above described predetermined words; and recognition means for determining the occurrence probability that a sequence of the above described feature parameters will occur, with reference to the feature parameters detected by the above described detection means and to the above described hidden Markov models, characterized in that the above described recognition means shares a state sequence of one hidden Markov model among the above described plurality of hidden Markov models for partial expression in the process of determining the above described occurrence probability, and the above described recognition means multiplies each preset pair of an output probability function value and a transition probability together among the output probability functions and transition probabilities preset in the above described plurality of hidden Markov models for partial expression, selects the largest product as the probability of each state of the above described common hidden Markov model, determines the above described occurrence probability based on the selected largest product, and then recognizes the input speech based on the occurrence probability thus determined.

Also, the present invention provides a speech recognition method comprising the steps of: prestoring, in memory, output probability functions and transition probabilities which use, as arguments, the above described feature parameters preset in multiple predetermined types of hidden Markov models which represent each of a plurality of predetermined words; and detecting feature parameters of input speech during speech recognition, determining the occurrence probability that a sequence of the above described feature parameters will occur, with reference to the detected feature parameters and to the above described hidden Markov models, and recognizing the input speech based on the occurrence probability thus determined, characterized in that the above described method gives each of the above described words a state sequence of one hidden Markov model common to the above described multiple types of hidden Markov models in the process of determining the above described occurrence probability, multiplies each preset pair of an output probability function value and a transition probability together among the output probability functions and transition probabilities stored in the above described memory, selects the largest product as the probability of each state of the above described common hidden Markov model, and determines the above described occurrence probability based on the selected largest product and then recognizes the input speech based on the occurrence probability thus determined.

Implementations of the speech recognition method according to the present invention include a speech recognition method characterized in that the transition probability of each state of the above described hidden Markov model is shared among the above described multiple types of hidden Markov models in order to determine the above described occurrence probability.

Implementations of the speech recognition method according to the present invention include a speech recognition method characterized in that the above described multiple predetermined types of hidden Markov models consist of at least two types from among gender-specific hidden Markov models, age-specific hidden Markov models, multiple hidden Markov models based on voice data which contain different types of noise, and other hidden Markov models.

Also, the present invention provides a speech recognition method comprising the steps of: prestoring, in memory, output probability functions and transition probabilities which use, as arguments, the above described feature parameters preset in hidden Markov models each of which represents each of a plurality of predetermined words and in a plurality of hidden Markov models which partially express differences in pronunciations of each of words which are allowed multiple pronunciations out of the above described predetermined words; and detecting feature parameters of input speech during speech recognition, determining the occurrence probability that a sequence of the above described feature parameters will occur, with reference to the detected feature parameters and to the above described hidden Markov models, and recognizing the input speech based on the occurrence probability thus determined, characterized in that the above described method shares a state sequence of one hidden Markov model among the above described plurality of hidden Markov models for partial expression in the process of determining the above described occurrence probability, multiplies each preset pair of an output probability function value and a transition probability together among the output probability functions and transition probabilities preset in the above described plurality of hidden Markov models for partial expression, and selects the largest product as the probability of each state of the above described common hidden Markov model, and determines the above described occurrence probability based on the selected largest product and then recognizes the input speech based on the occurrence probability thus determined.

In this way, the present invention uses multiple types of hidden Markov models (acoustic models), but recognizes vocabulary items (words) without using multi-templates during speech recognition. Thus, it can improve the accuracy of speech recognition rates without increasing the memory capacity of working memory or the like for speech recognition.

Also, even when there is more than one way to pronounce a single vocabulary item, for example, when expressed colloquially, the present invention can improve the accuracy of speech recognition rates using one type of hidden Markov model without increasing the memory capacity of working memory or the like for speech recognition.

DETAILED DESCRIPTION OF THE PREFERRED AND ALTERNATIVE EMBODIMENTS

Embodiments of the present invention will be described below with reference to the drawings.

An embodiment of a speech recognition device according to the present invention will be described with reference to FIGS. 1 to 3.

Figure 1:
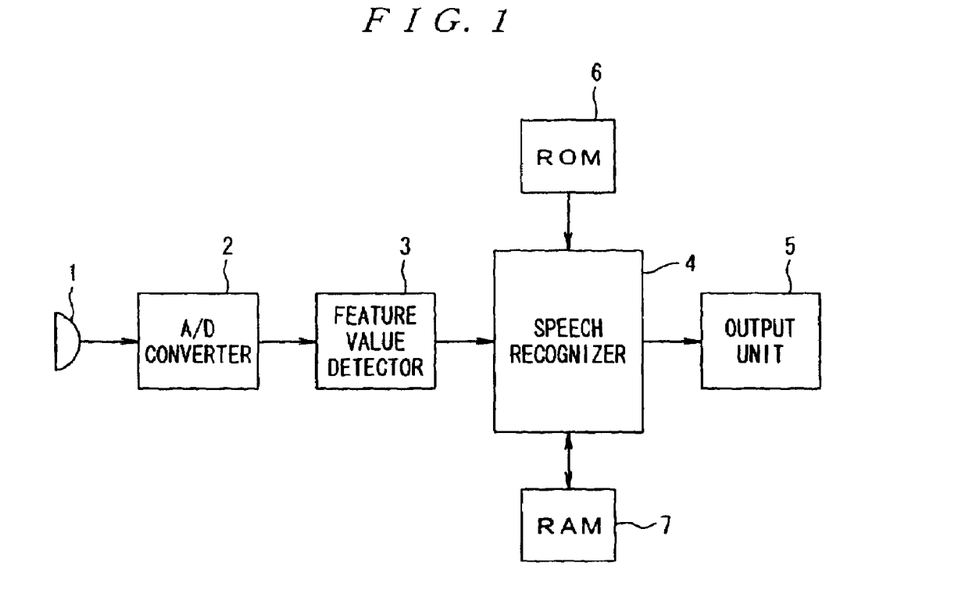
FIG. 1 is a block diagram showing a configuration example of an embodiment of a speech recognition device according to the present invention.

The speech recognition device according to the embodiment shown in FIG. 1 comprises at least a microphone 1, an A/D converter 2, a feature value detector 3, a speech recognizer 4, an output unit 5, a ROM 6, and a RAM 7.

The microphone 1 converts speech into a corresponding analog electrical signal. The A/D converter 2 converts the analog signal into a digital signal. The feature value detector 3 determines feature parameters based on the digital signal and converts the determined feature parameters into a time series.

The speech recognizer 4 recognizes speeches of unspecified speakers using hidden Markov models according to procedures described later. Details of the recognition procedures will be described later. The output unit 5, which may be, for example, a display unit, outputs recognition results produced by the speech recognizer 4.

The ROM 6 is a read only memory that stores the speech recognition procedures, the probability data for the female hidden Markov model, and the probability data for the male hidden Markov model.

The RAM 7 is a freely readable/writable random access memory and is used as a working memory during speech recognition as described later. It stores, for example, necessary data and results data temporarily during the process of speech recognition.

Next, speech recognition operations of the speech recognition device according to the embodiment with the above configuration will be described with reference to drawings.

According to this embodiment, two gender specific hidden Markov models are prepared in advance for vocabulary items (words) such as, "Hokkaido," "Aomori," and "Akita". The vocabulary are the set of words to be recognized by the speech recognition device when spoken by unspecified speakers. Constants used to form multiple pairs of a transition probability and the output probability function for individual states of each hidden Markov model are determined prior to use and these probability data are pre-stored in the ROM 6.

Suppose, for example, a spoken word "hotskaidou" is spoken by an adult speaker (irrespective of sex) through the microphone 1. The speech is converted into an analog electrical signal by the microphone 1 and converted into a digital signal by the A/D converter 2. The feature value detector 3 determines the feature parameters of the digital signal and converts the parameters into a time-series feature parameters.

Figure 2:
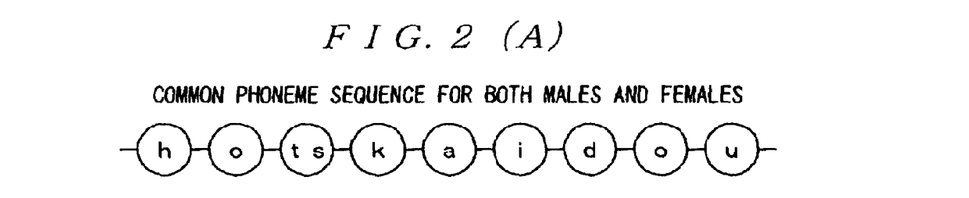
FIG. 2 is an explanatory diagram illustrating a Viterbi algorithm according to the embodiment of the present invention.

With reference to the transition probabilities and output probability functions of the gender specific hidden Markov models stored in the ROM 6 as well as to the converted time-series feature parameters (acoustic parameters), the speech recognizer 4 determines the occurrence probability of a sequence of the feature parameters using the Viterbi algorithm shown in FIG. 2. and recognizes the input speech based on the determined occurrence probability.

FIG. 2(A) shows a common phoneme sequence for both males and females while FIG. 2(B) shows a hidden Markov model state sequence of each phoneme.

In FIG. 2(B), a(I, J) represents the transition probability of a model for females transitioning from state I to state J and A(I, J) represents the transition probability of a model for males transitioning from state I to state J. Also, b(I, x) represents an output probability of state I given acoustic parameter x for the female hidden Markov model. Similarly, B(I, x) represents an output probability of state I given acoustic parameter x for the male hidden Markov mode.

In FIG. 2(B), pI represents the probability of state I in the common state sequence for both males and females and is updated according to Equation (6) below.

$$pI = \max(p(I-1) \times \text{PenterI}, pI \times \text{PselfI}) \quad (6)$$

where probability PselfI and probability PenterI are given by Equation (7) and Equation (8).

$$\text{PselfI} = \max(a(I, I) \times b(I, X), A(I, I) \times B(I, X)) \quad (7)$$

$$\text{PenterI} = \max(a(I-1, I) \times b(I, X), A(I-1, I) \times B(I, X)) \quad (8)$$

Thus, the speech recognizer 4 gives a state sequence of one common hidden Markov model to one vocabulary item (word) such as "Hokkaido" or "Aomori" common to separate hidden Markov models for males and females.

The probability of each state of the common hidden Markov model is determined for each word. To do that, the output probability function and transition probability preset in the hidden Markov model for males are multiplied together using the feature parameter obtained from the feature value detector 3 as an argument (input). Similarly, the output probability function and transition probability preset in the female hidden Markov model are multiplied together using the feature parameter obtained from the feature value detector 3 as an argument (input). The larger of the two probability values (products) determined is selected (see Equations (7) and (8)).

The above operations are performed for each state transition of the hidden Markov models to finally determine the probabilities of the states. Consequently, a state sequence of one hidden Markov model is created for each word such as "Hokkaido" or "Aomori." Each state sequence thus created contains a mixture of products of probability data related to the male hidden Markov model and to the female hidden Markov model.

Figure 3:
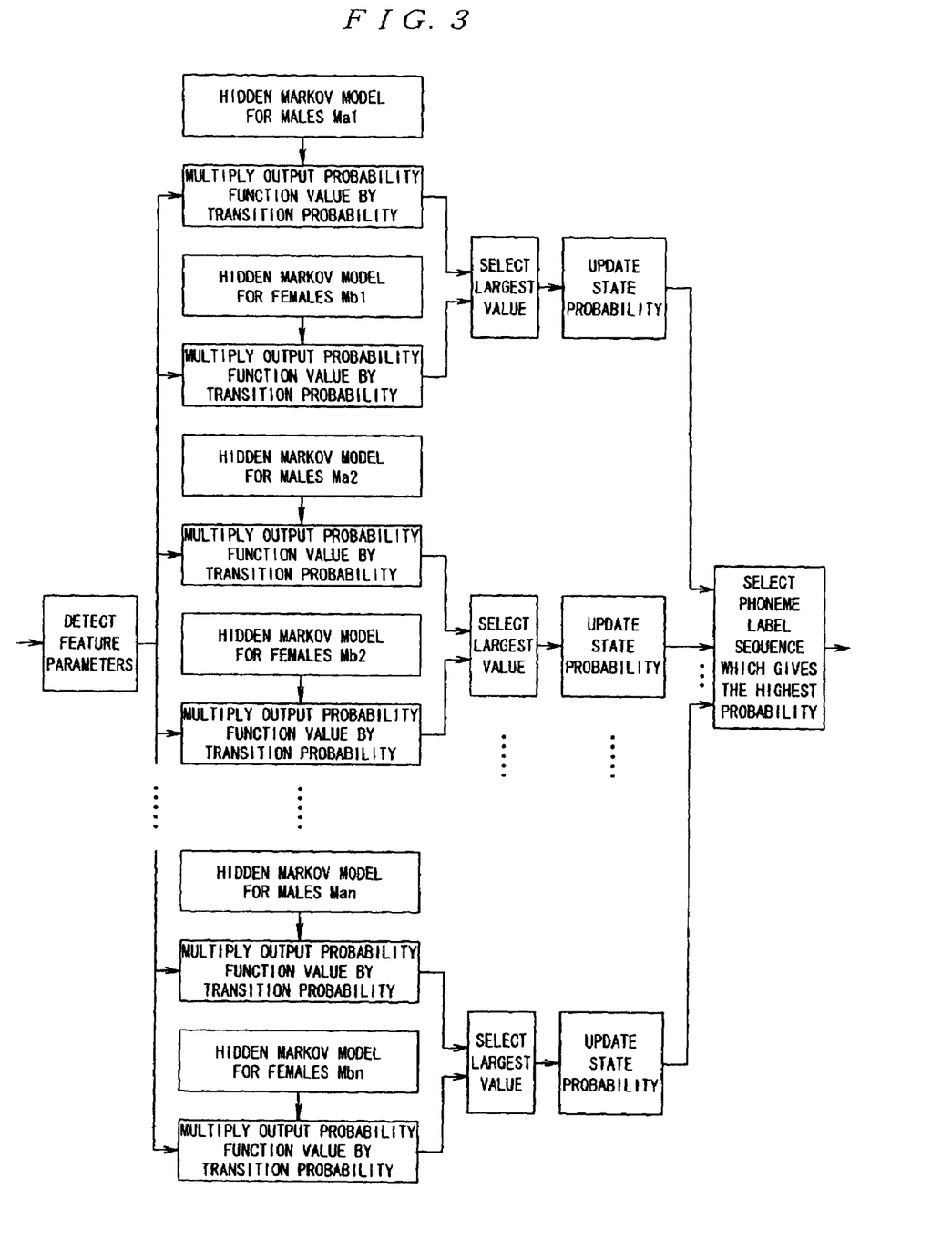
FIG. 3 is an explanatory diagram illustrating an overall flow of recognition operations according to the embodiment of the present invention.

An overall data flow in the speech recognizer 4 of the speech recognition device according to this embodiment is summarized as shown in FIG. 3.

As shown in FIG. 3, first, feature parameters are detected in (extracted from) a speech signal. Next, with reference to the detected feature parameters, the male hidden Markov models (words) Ma1, Ma2, ... Man determined in advance, and the female hidden Markov models (words) Mb1, Mb2, ... Mbn determined in advance, occurrence probabilities of the feature parameter sequence are calculated using Equations (7) and (8).

To determine the probability of each state of the common hidden Markov model (common hidden Markov model for both males and females) for each word, the output probability function and transition probability preset in the hidden Markov model for males are multiplied together using the given feature parameter as an argument and the output probability function and transition probability preset in the hidden Markov model for females are multiplied together using the given feature parameter as an argument. Then, the larger of the two probability values (products) determined is selected.

The products selected in this way are summed to determine the occurrence probability of each feature parameter sequence. The highest probability is selected from the determined occurrence probabilities and the phoneme label sequence which gives the highest probability is obtained as a recognition result of the input speech.

As described above, a word common to the separate gender-specific hidden Markov models has a state sequence of one common hidden Markov model and the probability of each state of the common hidden Markov model is determined. To do that, the output probability function and transition probability preset in the hidden Markov model for males are multiplied together using a given feature parameter as an argument and the output probability function and transition probability preset in the hidden Markov model for females are multiplied together using the given feature parameter as an argument. Then, the larger of the two probabilities determined is selected.

Thus, this embodiment may improve the recognition rate regardless of differences in age and sex, using a plurality of hidden Markov models.

Also, according to this embodiment, a hidden Markov model common to separate gender-specific hidden Markov models is provided for speech recognition. Consequently, this embodiment can reduce the memory capacity dependent on the number of states to be calculated to half the memory capacity required by the algorithm shown in FIGS. 9 and 10.

According to the above embodiment, the probability of each state in the common state sequence for both males and females is determined based on Equations (6) to (8) instead of using a state transition probability common to a model for males and model for females.

However, according to this invention, a state transition probability common to a model for males and a model for females may also be used. In such a case, to determine a probability in a common state sequence for both males and females, the largest output probability is selected first, and then the selected output probability is multiplied by the common transition probability.

An alternative embodiment of the present invention is now described.

The speech recognition device according to an embodiment has one hidden Markov model to handle the case where there is more than one way to pronounce a single vocabulary item, for example, when expressed colloquially.

The speech recognition device according to the alternative embodiment is configured similarly to the speech recognition device shown in FIG. 1, but differs in that probability data described later and recognition procedures described later are stored in the ROM 6 and that the recognition procedures stored in the ROM 6 for the speech recognizer 4 are as described later. Thus, only the different parts will be described.

Specifically, according to the embodiment, each of the words to be recognized is represented by a hidden Markov model. Words having multiple pronunciations are modeled by a global hidden Markov model with the different pronunciations of the word being partially expressed by a plurality of hidden Markov models. Transition probabilities and output probability functions, which use, as arguments, feature parameters for these hidden Markov models are stored in the ROM 6.

During speech recognition, the speech recognizer 4 determines the occurrence probability that a sequence of the feature parameters supplied from the feature value detector 3 will occur using the hidden Markov models, and recognizes the input speech based on the estimated occurrence probability.

During the process of determining the occurrence probability, the speech recognizer 4 shares a state sequence of the global hidden Markov model among the plurality of hidden Markov models for partial expression.

The speech recognizer 4 multiplies each pair of an output probability function value and a transition probability together among the output probability functions and transition probabilities preset in the plurality of hidden Markov models for partial expression, and selects the largest product as the probability of each state of the common hidden Markov model.

In addition, the speech recognizer 4 determines the occurrence probability based on the selected largest product and then recognizes the input speech based on the occurrence probability thus determined.

Figure 4:
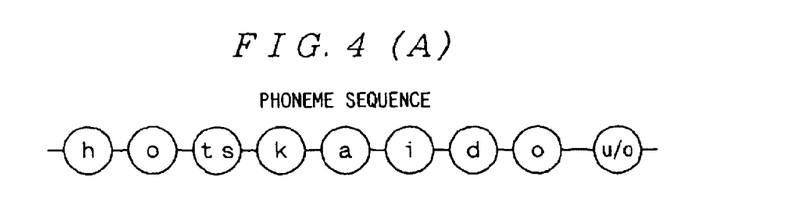
FIG. 4 is an explanatory diagram illustrating a Viterbi algorithm according to another embodiment of the present invention.

FIG. 4 shows a Viterbi algorithm used for the speech recognition device according to this embodiment. FIG. 4(A) shows a phoneme sequence when, for example, vocabulary item "Hokkaido" is allowed to be pronounced both as "hotskaidou" and "hotskaidoc" while FIG. 4(B) shows hidden Markov model states which represent the last phoneme that differs between the two pronunciations.

In FIG. 4(B), au(I, J) represents the transition probability of the phoneme u transitioning from state I to state J and ao(I, J) represents the transition probability of the phoneme o transitioning from state I to state J. Also, bu(I, x) represents the output probability of (?) state I for acoustic parameter x of the phoneme u and bo(I, x) represents the output probability of state I for acoustic parameter x of the phoneme o.

In FIG. 4(B), pi represents the probability of state I in the state sequence of the phoneme u/o and is updated according to Equation (9) below.

$$pI = \max(p(I-1) \times \text{PenterI}, pI \times \text{PselfI}) \tag{9}$$

where probability PselfI and probability PenterI are given by Equation (10) and Equation (11).

$$\text{PselfI} = \max(au(I, I) \times bu(I, X), ao(I, I) \times bo(I, X)) \tag{10}$$

$$\text{PenterI} = \max(au(I-1, I) \times bu(I, X), ao(I-1, I) \times bo(I, X)) \tag{11}$$

The Viterbi algorithm, according to this embodiment, makes the speech recognizer 4 have a state sequence of a hidden Markov model common to the phoneme u and phoneme o. The probability of each state of the common hidden Markov model is determined by forming the product of the output probability function for the phoneme u and the transition probability for the phoneme u, comparing the product to the product of the output probability function for the phoneme o and the transition probability for the phoneme o, and selecting the phoneme having the largest product.

As described above, since this embodiment shares a state sequence of one hidden Markov model between the phoneme u and phoneme o, it can reduce the memory capacity required for recognition computation in comparison to the algorithm in FIG. 11.

Figure 5:
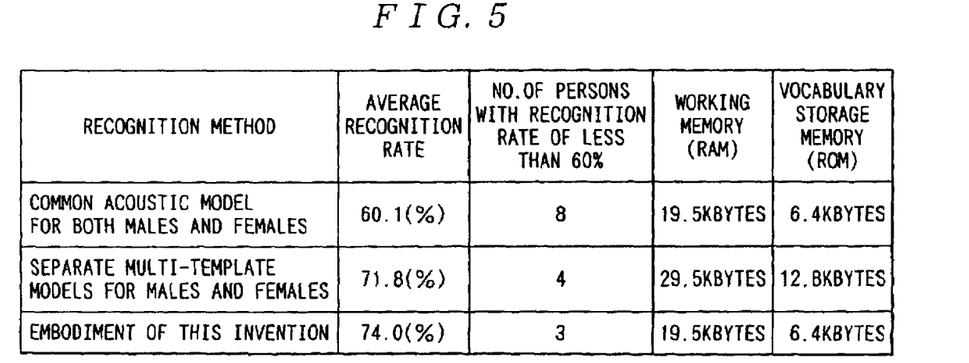
FIG. 5 is a diagram comparing an example according to the present invention and conventional examples in an exemplary manner.

A comparison of speech recognition methods applied to Japanese digit recognition, without limit to the number of digits, using 10 male voices and 10 female voices is shown in FIG. 5. The voices were recorded in a clean environment and were superimposed with noises obtained at an exhibition to simulate noisy conditions (S/N ratio=10 dB). Pruning was used in Viterbi processing so that approximately 80% of all the state of the common models for both males and females could maintain states of hidden Markov models. Three speech recognition methods are compared in FIG. 5. The first method used a common acoustic model for both male and female voices. The second method used separate gender-specific acoustic models. The third method used the embodiment of the present invention shown in FIGS. 1-3. FIG. 5 lists the recognition rates and memory requirements for each method.

FIG. 5 shows higher recognition rates for the present invention compared to the common acoustic model and to the gender-specific acoustic model. Furthermore, the number of persons for whom the recognition rate is lower than 60% is reduced for the present invention compared to the common and gender-specific models. This may be because the use of the separate models for males and females reduced the tendency toward lower recognition rates for more masculine voice or more feminine voice in terms of acoustic characteristics which was observed under the "condition in which common acoustic models for both males and females were used."

FIG. 5 also shows that the present invention exhibits recognition rates superior to both the common and gender-specific acoustic models while retaining the lower working memory and vocabulary storage memory requirements of the common acoustic model.

According to the above embodiment (shown in FIGS. 1 to 3), each word to be recognized in speech recognition is represented by two types of hidden Markov models, hidden Markov models for males and females, and output probability functions and transition probabilities preset in these hidden Markov models are stored in the ROM 6.

During speech recognition, the speech recognizer 4 determines the occurrence probability that a sequence of the feature parameters will occur using the hidden Markov models and based on the feature parameters supplied from the feature value detector 3. The input speech is recognized based on the determined occurrence probability.

In one embodiment, the speech recognizer 4 has a state sequence of one hidden Markov model common to the two gender-specific hidden Markov models for each word. The probability of each state of the common hidden Markov model is determined by multiplying the output probability function by the preset transition probability for the male hidden Markov model, multiplying the output probability function by the preset transition probability for the female hidden Markov model and selecting the larger of the two probabilities.

In addition to the case where each word to be recognized in speech recognition is represented by the two t gender-specific hidden Markov models, the present invention applies to the following three cases, as required.

The first case involves using two age-specific hidden Markov models, one for adults and one for children, to represent each word to be recognized in speech recognition.

The second case involves using five types of hidden Markov models specific to adult males, adult females, aged males and aged females, and children, or using a plurality of separate hidden Markov models for different age groups.

The third case involves using a hidden Markov model based on voice data which does not contain much noise and a hidden Markov model based on voice data which contains much noise to represent each word to be recognized in speech recognition.

For example, when a speech recognition device is used in a car, the noise level is very low if the car is not running, but noise increases as the car speeds up or the volume of a car stereo is turned up. Under such noisy conditions, the signal-to-noise ratio (S/N ratio) may decrease to about −10 dB.

On the other hand, when using hidden Markov models based on voice data containing low noise with a signal-to-noise ratio of around 20 dB, recognition performance lowers with increases in noise and becomes unpractical at 0 dB or below.

Conversely, when using hidden Markov models based on voice data superimposed with much noise with a signal-to-noise ratio of around −10 dB, good recognition performance is obtained at a signal-to-noise ratio of −10 to 0 dB, but in a quiet environment with 0 dB or above, the recognition performance lowers to an unpractical level.

Thus, in the third case, a hidden Markov model based on voice data with a signal-to-noise ratio of 20 dB and a hidden Markov model based on voice data with a signal-to-noise ratio of −10 dB are used. High speech recognition performance is maintained in a wide rage of environments from a high-noise environment with a signal-to-noise ratio of −10 dB to a quiet environment with a signal-to-noise ratio exceeding 20 dB.

There are various types of noise including noise in a moving car as described above, bustle in a downtown area, background music (BGM), and noise in offices, plants, and other locations. Under the expected range of conditions where the present invention may be used, the signal-to-noise ratio is expected to vary greatly. Thus, a hidden Markov model based on superimposition with relatively quiet background noise, such as for example, a relatively quiet downtown area or background office noises, and a hidden Markov model based on superimposition with high background noises, such as those produced in a moving car, may be used in combination for higher recognition rates.

The procedures used in the first to third cases are the same as those of the above embodiments except that the two types of hidden Markov models described above are used, and thus description thereof will be omitted.

According to the above embodiments, description has been given of the case where each word to be recognized in speech recognition is represented by two types of hidden Markov models, hidden Markov models for males and females, and the case where each word to be recognized in speech recognition is expressed in the manner described with reference to the first to third cases.

However, according to the present invention, each word to be recognized in speech recognition may be represented, for example, by four types of hidden Markov models: gender-specific hidden Markov models and two hidden Markov models based on voice data containing different types of noise.

It is also possible to prepare hidden Markov models based on voice data divided into a plurality of groups with different features including acoustic characteristics which vary with the vocal-tract shape of the speaker such as length or thickness, how he/she opens his/her mouth, pitch, inflection, or accent of his/her voice, talking speed, or operating environment.

INDUSTRIAL APPLICABILITY

In this way, the present invention uses multiple types of hidden Markov models (acoustic models), but recognizes vocabulary items (words) without using multi-templates during speech recognition. Thus, it can improve the accuracy of speech recognition rates without increasing the memory capacity of working memory or the like for speech recognition.

Also, even when there is more than one way to pronounce a single vocabulary item, for example, when expressed colloquially, the present invention can improve the accuracy of speech recognition rates using one type of hidden Markov model without increasing the memory capacity of working memory or the like for speech recognition.

We claim:

1. A speech recognition device for recognizing speech using a plurality of predetermined types of hidden Markov models, each of which represents a predetermined word, said device comprising:

detection means for detecting feature parameters of input speech;

data storage means for pre-storing output probability functions and transition probabilities of said predetermined types of hidden Markov models and using, as arguments, said feature parameters; and recognition means for recognizing the input speech based on occurrence probability that a sequence of said feature parameters will occur with reference to said feature parameters and to said hidden Markov models, wherein said recognition means assigns each of said predetermined word a state sequence of one hidden Markov model common to said predetermined types of hidden Markov models in the process of determining said occurrence probability, determines probability of each state of said common hidden Markov model by multiplying an output probability function value and a transaction probability of each of said plurality of predetermined types of hidden Markov models to obtain a plurality of products and selecting the largest product, and determines said occurrence probability based on the selected largest product to recognize the input speech.

2. The speech recognition device according to claim 1, wherein said recognition means shares transition probability of each state of said common hidden Markov model among said predetermined types of hidden Markov models in order to determine said occurrence probability.

3. The speech recognition device according to claim 2, wherein the multiple predetermined types of hidden Markov models are selected from the group consisting of gender-specific hidden Markov models, age-specific multiple hidden Markov models, and multiple hidden Markov models based on voice data which contain different types of noise.

4. The speech recognition device according to claim 1, wherein said predetermined types of hidden Markov models is comprise at least one of gender-specific hidden Markov models, age-specific multiple hidden Markov models, and multiple hidden Markov models based on voice data which contain different types of noise.

5. A speech recognition device for recognizing speech using a plurality of hidden Markov models, said device comprising:
  detection means for detecting feature parameters of input speech;
  data storage means for pre-storing output probability functions and transition probabilities of a plurality of first and second hidden Markov models, and output probability functions, which use using, as arguments, said feature parameters, said plurality of first hidden Markov models representing a plurality of predetermined words, said plurality of second hidden Markov models partially expressing differences in pronunciations of one or more words which are allowed multiple pronunciations out of said predetermined words; and
  recognition means for recognizing the input speech based on occurrence probability that a sequence of said feature parameters will occur, with reference to the feature parameters and to said hidden Markov models, wherein said recognition means shares a state sequence of one common hidden Markov model among said plurality of second hidden Markov models for partial expression in the process of determining said occurrence probability, multiplies an output probability function value and a transition probability in each of said plurality of second hidden Markov models to obtain a plurality of products, selects the largest product as probability of each state of said common hidden Markov model, and determines said occurrence probability based on the selected largest product to recognize the input speech.

6. A speech recognition method using a plurality of predetermined types of hidden Markov models, each of which represents a predetermined word, said method comprising:
  detecting feature parameters of input speech;
  pre-storing output probability functions and transition probabilities of said predetermined types of hidden Markov models using, as arguments, said feature parameters; and
  determining occurrence probability that a sequence of said feature parameters will occur, with reference to the detected feature parameters and to said hidden Markov models, to recognize the input speech by the following acts:
    assigning said predetermined word a state sequence of one hidden Markov model common to said predetermined types of hidden Markov models in the process of determining said occurrence probability;
    multiplying an output probability function value and a transition probability of each of said plurality of predetermined types of hidden Markov models together to obtain a plurality of products;
    selecting the largest product as probability of each state of said common hidden Markov model; and
    determining said occurrence probability based on the selected largest product to recognize the input speech.

7. The speech recognition method according to claim 6, wherein transition probability of each state of said common hidden Markov model is shared among said predetermined types of hidden Markov models in order to determine said occurrence probability.

8. The speech recognition method according to claim 7, wherein the multiple predetermined types of hidden Markov models are selected from the group consisting of gender-specific hidden Markov models, age-specific hidden Markov models, and multiple hidden Markov models based on voice data which contain different types of noise.

9. The speech method according to claim 6, wherein said predetermined types of hidden Markov models comprise at least one of gender-specific hidden Markov models, age-specific hidden Markov models, and multiple hidden Markov models based on voice data which contain different types of noise.

10. A speech recognition method using a plurality of hidden Markov models, said method comprising:
  detecting feature parameters of input speech;
  pre-storing output probability functions and transition probabilities of a plurality of first and second hidden Markov models, and using, as arguments, said feature parameters, said plurality of first hidden Markov models representing a plurality of predetermined words, said plurality of second hidden Markov models partially expressing differences in pronunciations of one or more words which are allowed multiple pronunciations out of said predetermined words;
  determining the occurrence probability that a sequence of said feature parameters will occur, with reference to the detected feature parameters and to said hidden Markov models, to recognize the input speech by the following acts:
    sharing a state sequence of one hidden Markov model among said plurality of second hidden Markov models for partial expression in the process of determining said occurrence probability;
    multiplying an output probability function value and a transition probability of each of said plurality of second hidden Markov models for partial expression to obtain a plurality of products;
    selecting the largest product as probability of each state of said common hidden Markov model; and
    determining said occurrence probability based on the selected largest product to recognize the input speech.

* * * * *

UNITED STATES PATENT AND TRADEMARK OFFICE
CERTIFICATE OF CORRECTION

PATENT NO.       : 7,272,561 B2
APPLICATION NO.  : 10/332875
DATED            : September 18, 2007
INVENTOR(S)      : Toshiyuki Miyazaki

It is certified that error appears in the above-identified patent and that said Letters Patent is hereby corrected as shown below:

In Claim 4, column 13, line 20, delete "is".

In Claim 5, column 13, line 32, delete ", which use".

Signed and Sealed this

Twenty Second Day of April, 2008

JON W. DUDAS
*Director of the United States Patent and Trademark Office*